Nov. 1, 1938. J. C. HARKNESS 2,134,942
IMPLEMENT
Filed Jan. 6, 1936
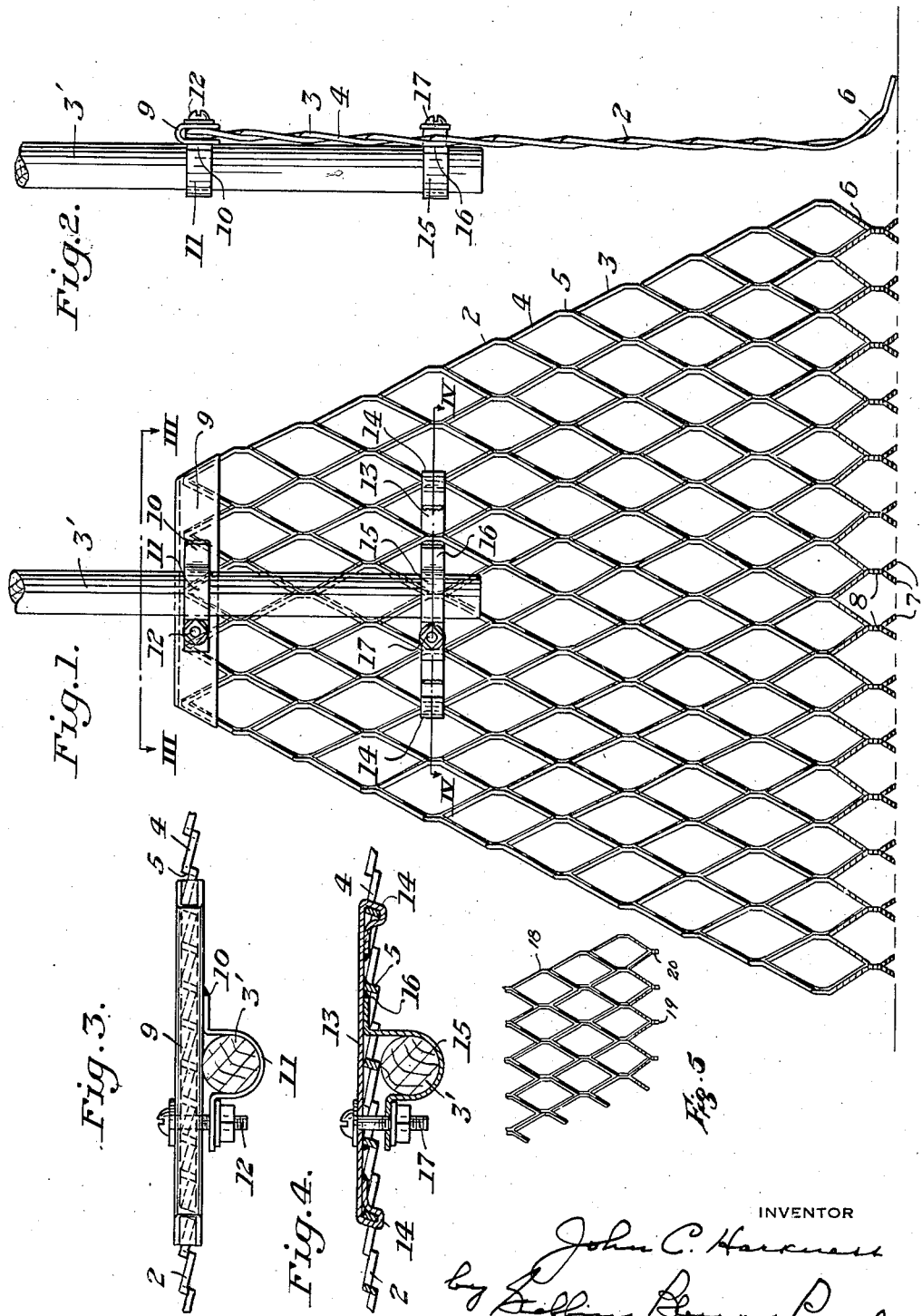
INVENTOR
John C. Harkness Patented Nov. 1, 1938

2,134,942

UNITED STATES PATENT OFFICE 2,134,942

IMPLEMENT

John C. Harkness, Glencoe, Ill., assignor to The Consolidated Expanded Metal Companies, a corporation of West Virginia Application January 6, 1936, Serial No. 57,693

8 Claims. (Cl. 55—10)

This invention relates broadly to implements, and more particularly to hand implements of the class embracing lawn and garden tools. It relates still more particularly to an implement of the type generally referred to as a rake, although in some of its preferred forms my implement is adapted to function somewhat differently than the well known type of lawn rake.

I provide an implement generally resembling a rake and which performs inter alia a raking function and which may therefore be broadly termed a rake. My implement is, however, of novel construction and has novel characteristics, and when embodied in the particular preferred form shown in the drawing and hereinafter to be described is adapted to perform both the functions of a rake and the functions of what is commonly called a lawn broom or broom rake.

I preferably provide an implement of the character mentioned which comprises a head comprising a sheet of foraminous material of uniform structure throughout its entire extent and having a portion adjacent an edge of the sheet extending at an angle to the body of the sheet. A handle is preferably connected with the head, preferably at the portion thereof opposite the angularly extending portion above mentioned. The material of which the head is made is preferably structurally strong and relatively stiff as compared with what is generally termed a broom rake which is essentially very flexible. The head of my implement may be made more or less flexible depending upon the particular type of material used and the particular function for which it is designed. For normal uses I prefer that the head be comparatively stiff although having a slight amount of spring, which facilitates its use.

I find it desirable to form the head of my implement out of material of sufficient longitudinal and transverse strength and rigidity that the head, although preferably essentially foraminous in character, may be entirely self-supporting and hence frameless. In a preferred form the head consists solely of a sheet of suitably shaped foraminous material, preferably of integral or unitary character. I have found that important advantages are obtained by forming the head of the implement of expanded metal. Expanded metal is a completely unitary material comprising strands and bonds formed by slitting and expanding a metal plate or sheet. It is characterized by exceptional strength in all directions and by relatively light weight.

I have found that a sheet of expanded metal properly cut and trimmed and preferably with a portion adjacent an edge thereof bent at an angle to the body of the sheet forms a remarkably efficient head for an implement of the type in question. The edges of a sheet of expanded metal are, by reason of the very nature of the material, uneven, particularly the longitudinal edges,—that is to say, the edges at the ends of the sheet in the direction of the major axes of the diamonds. These edges are characterized by a series of spaced projections. The number, length and spacing of the projections may be determined by the size of the diamonds and by the particular place in the expanded metal at which it is cut. If it is cut through the strands intermediate the bonds the severed strand ends form the spaced projections. If it is cut through the bonds the severed bond ends form the spaced projections. In either event such projections are admirably suited to function as operating means for the implement, such operating means in a rake being termed teeth or tines.

Although an implement in accordance with my invention may be made with material other than expanded metal, when expanded metal is used in forming the head of the implement so many advantages are obtained that are not obtainable with any other material that I consider the invention best embodied in an implement having an expanded metal head, and the invention will therefore be described purely for the sake of explanation and illustration as embodied in a rake or rake-like implement having a head made out of expanded metal.

Other details, objects and advantages of the invention will become apparent as the following description of a present preferred embodiment thereof proceeds.

In the accompanying drawing I have shown a present preferred embodiment of the invention, in which Figure 1 is a top plan view of an implement with a portion of the handle broken away;

Figure 2 is a side elevational view of the implement shown in Figure 1;

Figure 3 is a transverse cross-sectional view through the implement taken along the line III—III of Figure 1;

Figure 4 is a transverse cross-sectional view through the implement taken along the line IV—IV of Figure 1; and Figure 5 is a fragmentary view showing a portion of the head of an implement similar to that shown in Figures 1 to 4, inclusive, but having a working edge defined by severed bonds of expanded metal.

Referring now more particularly to the drawing, there is shown an implement having a head 2 and a handle 3'. The size of the head and diameter and length of the handle are preferably such that the implement is readily adapted to be handled and used similarly to a rake by a man of average strength and stature.

The head 2 in the embodiment shown comprises an integral piece of expanded metal 3 having strands 4 and bonds 5. The expanded metal is of ordinary construction and may be taken from stock. The head 2 is preferably tapered to increasing width from the end to which the handle is connected toward the opposite end, and the major axes of the diamonds preferably extend longitudinally of the head or parallel to the direction of taper. The tapered effect is preferably obtained by trimming the expanded metal in such manner that the side edges of the head are defined by diagonally connected strands and bonds as shown. When this is done a number of heads can be fabricated out of a single sheet of expanded metal with very little wastage, adjacent heads cut out of the sheet being oppositely tapered.

A portion 6 of the head adjacent the lower or wider end edge thereof is preferably bent as shown in Figure 2 so as to extend at an angle to the body of the head. Such bending may be at any appropriate radius or along any appropriate line depending upon the particular use for which the implement is intended, a head having a bent end portion as shown in Figures 1 and 2 being found ideally suited for lawn raking purposes. The lower edge of the head is defined by a series of spaced severed strands 7 which serve as teeth or tines. Such teeth extend at an angle to the longitudinal direction of the head, adjacent pairs converging in bonds 8. The length and spacing of the teeth may be determined according to the particular point between bonds where the expanded metal is cut. I find it preferable to cut the expanded metal so that the teeth are somewhat shorter than the teeth of a standard type garden rake. I find that an implement thus formed is far superior to any other implement of like character which I have seen in picking up and removing dead matted grass which collects at the grass roots and also small twigs, stones, acorns and the like. It is well known that such small objects pass freely between the teeth of an ordinary rake, and the broom rake was devised in an effort to clean out such objects. However, the broom rake, by reason of its relatively great flexibility and consequent lack of strength, is not adapted for heavy duty work. My implement functions both as a heavy duty rake for raking up cut grass or leaves and also for cleaning out the grass adjacent the roots and effectively carrying along small objects as above mentioned. My implement may therefore be termed a composite of an ordinary garden rake, a broom rake and a comb.

The body of the head is comparatively stiff and structurally strong in all directions, the strands of the expanded metal acting as struts or stress carrying members between the bonds. The head may be given a desired amount of spring simply by selecting an appropriate weight of expanded metal. For ordinary uses it should be comparatively stiff, although a slight spring assists in its manipulation.

The head is preferably of comparatively large size considering both its width and its height. Its width may be commensurate with the width of an ordinary lawn or leaf rake, and it is of exceptionally great height, thus adapting it for heavy duty work in piling up cut grass and leaves. Due to the relatively light weight of expanded metal as compared with its strength, even a head of exceptional size may not be any heavier than or even as heavy as the head of an ordinary steel rake.

An important characteristic of my implement, due to the peculiar relationship to each other of the teeth is that it does not accumulate grass and leaves which have to be continually cleaned out. The teeth are formed in pairs with the respective teeth of each pair inclined toward each other and joined at a bond as above explained. Thus the interstices between the respective teeth of each pair are of generally triangular shape and are not conducive to clogging. The interstices between adjacent pairs of teeth are comparatively large and flaring, as shown in Figure 1, and are also tapered just as are the interstices between the respective teeth of a pair, so that the implement is substantially non-clogging. If grass or leaves should for any reason become embedded in the edge of the head it may readily be cleaned simply by turning it over and drawing it for a short distance along the ground, as the material clinging to it will be readily dislodged due to the peculiar relation of the teeth described above, which is not true in rakes with parallel or substantially parallel teeth.

The position in which my implement is held is dependent upon the work which it is desired to do. To dig out dead grass, twigs, acorns, etc., from adjacent the grass roots the handle is held in a more or less horizontal position. As the raking progresses and the accumulated material is carried along, the handle is raised to a more vertical position.

The handle may be connected with the head in any appropriate manner. In the drawing I have shown a saddle member 9 of generally U-shaped cross section fitted over the upper end of the head and welded thereto. Connected with the saddle member 9 at 10, as, for example, by welding, is a strap 11 adapted to receive the handle and the opposite extremity of which may be bolted to the member 9 at 12. A bracket 13 is connected with the head at a point lower down thereon, the connection being effected in any appropriate manner, as, for example, by welding the bracket to the portions of the head which it crosses, and by turning the ends of the bracket about portions of the head, as shown at 14, and welding such ends to the body of the bracket. A strap 15 is welded to the bracket at 16 and extends over the lower end of the handle and is bolted to the bracket at 17.

In Figure 5 is shown a fragment of a head of an implement generally similar to that shown in Figures 1 to 4, inclusive, comprising a sheet of expanded metal 18 having a working edge 19 defined by severed bonds 20 of the expanded metal.

The particular form of implement shown also has various other advantages which are more or less obvious from what has been said above and which need not be explained in detail. Moreover, the form of the implement may be varied in numerous respects, adapting it for performing widely different functions.

While I have shown and described a present preferred embodiment of the invention, it is to be distinctly understood that the same is not limited thereto but may be otherwise variously embodied within the scope of the following claims.

I claim:

1. An implement of the class described comprising a head structure consisting solely of a cut piece of expanded metal with a cut edge positioned to serve as a working edge of the implement.

2. An implement of the class described comprising a sheet of expanded metal having an edge thereof extending at an angle to the body of the sheet, portions of the expanded metal serving as operating means at said edge.

3. An implement of the class described comprising a head having a portion thereof extending at an angle to the body of the head and having teeth whose axes are laterally inclined joined together in said portion of the head.

4. An implement of the class described comprising a sheet of diamond mesh expanded metal disposed with the major axes of the diamonds extending generally longitudinally of the implement, the sheet being cut substantially at right angles to the length of the implement to provide a working edge.

5. An implement of the class described comprising a head comprising a sheet of expanded metal having a working edge defined by severed strands of the expanded metal.

6. An implement of the class described comprising a head comprising a sheet of expanded metal having a working edge defined by severed bonds of the expanded metal.

7. An implement of the class described comprising a tapered head comprising a piece of expanded metal whose side edges are defined by diagonally connected strands and bonds.

8. An implement of the class described comprising a head comprising a sheet of foraminous material of uniform structure throughout its entire extent and having a free edge serving as a working edge of the implement, a portion adjacent such edge of the sheet extending at an angle to the body of the sheet.

JOHN C. HARKNESS.